(12) United States Patent
Ogata

(10) Patent No.: US 6,174,615 B1
(45) Date of Patent: Jan. 16, 2001

(54) COMPOSITE OF POLYSILAMINE AND STRONG ACID

(75) Inventor: Naoya Ogata, Tokyo (JP)

(73) Assignee: Aventis Research & Technologies GmbH & Co. KG, Frankfurt am Main (DE)

( * ) Notice: Under 35 U.S.C. 154(b), the term of this patent shall be extended for 0 days.

(21) Appl. No.: 09/301,845

(22) Filed: Apr. 29, 1999

(30) Foreign Application Priority Data

May 1, 1998 (JP) .................................................. 10-122403

(51) Int. Cl.$^7$ ...................................................... H01M 8/10
(52) U.S. Cl. ............................. 429/33; 428/447; 429/313; 528/27
(58) Field of Search ............................... 429/33, 188, 189, 429/313; 428/436, 437, 447; 528/10, 12, 27, 38, 171, 423, 556

(56) References Cited

U.S. PATENT DOCUMENTS

| | | | |
|---|---|---|---|
| 4,170,700 | * 10/1979 | Sweet | 528/12 |
| 4,250,074 | * 2/1981 | Foscante | 260/32.8 |
| 4,826,752 | * 5/1989 | Yoshida | 430/155 |
| 5,064,722 | * 11/1991 | Swofford | 429/447 |
| 5,138,013 | * 8/1992 | Mason | 528/27 |
| 5,209,871 | * 5/1993 | Mason | 252/500 |
| 5,225,582 | * 7/1993 | Mason | 556/423 |
| 5,859,722 | * 1/1999 | Suga | 359/265 |
| 5,902,636 | * 5/1999 | Grabbe | 427/221 |
| 5,985,477 | * 11/1999 | Iwasaki | 429/33 |

* cited by examiner

Primary Examiner—Maria Nuzzolillo
Assistant Examiner—Mark Ruthkosky
(74) Attorney, Agent, or Firm—Frommer Lawrence & Haug

(57) ABSTRACT

A composite comprising a polysilamine having a repeating unit represented by the following formula $$[-N(R^1)-A^1-Si(R^2)(R^3)-B-]$$

wherein
$R^1$, $R^2$ and $R^3$ are the same or different and each is a hydrogen atom or a lower alkyl group;
$A^1$ is a lower alkylene group which may be substituted by a lower alkyl group, a group represented by the formula $-A^2-N(R^4)-A^3-$ or a group represented by the formula $-A^2-N(R^4)-A^3-N(R^5)-A^4-$, wherein $A^2$, $A^3$ and $A^4$ are the same or different and each is a lower alkylene group which may be substituted by a lower alkyl group;
$R^4$ and $R^5$ are the same or different and each is a hydrogen atom or lower alkyl groups;
B is a lower alkylene group which may be substituted by a lower alkyl group; and
n is an integer of not less than 2, and a strong acid is disclosed. This composite has proton conductivity and is thus suitably used as an electrolyte membrane of a fuel cell.

6 Claims, 16 Drawing Sheets

COMPOSITE OF POLYSILAMINE AND STRONG ACID

FIELD OF THE INVENTION

The present invention relates to a composite of a polysilamine and a strong acid. The composite of the present invention can be suitably used as the electrolyte membrane of a fuel cell.

BACKGROUND OF THE INVENTION

A cell has an electrolyte and a pair of electrodes separated by the electrolyte. In the case of a fuel cell, a fuel (for example, hydrogen) is supplied to one electrode and an oxidizing agent(for example, oxygen) is supplied to the other electrode. In this way, the chemical energy accompanied by the oxidation of the fuel is converted into electric energy. The electrolyte aims to permeate a hydrogen ion but not a reactant (hydrogen and oxygen). Typically, a fuel cell has a plurality of unit cells, and each unit cell has an electrolyte and a pair of electrodes separated by the electrolyte.

A solid such as a polymer electrolyte membrane and a liquid such as phosphoric acid have been used as the electrolyte of the fuel cell in these days. As the electrolyte of the fuel cell, polymer electrolyte membranes can be suitably employed.

The polymer electrolyte includes, for example, a perfluorosulfonic acid polymer, and the perfluorosulfonic acid polymer typically has such a structure that to a perfluorocarbon backbone (for example, a copolymer of tetrafluoroethylene and trifluorovinyl), side chains having a sulfonic group (for example, a side chain of a sulfonic group bonded to a perfluoroalkylene group) are bonded. The sulfonic acid group can dissociate a hydrogen ion therein to produce an anion thereby showing proton conductivity. Further, the use of a gel as the electrolyte is proposed.

In addition, as other polymer electrolytes, alkylphosphoric acids of polybenzimidazole are described in Japanese Patent Publication (Kokai) No. Hei 9-110982/1997. It is desirable to produce a polymer electrolyte, which is totally different. On the other hand, polysilamines are reported in the March (1995) issue of Polymer, vol. 44, p. 623.

SUMMARY OF THE INVENTION

Accordingly, one aspect of the present invention provides a composite which comprises:

a polysilamine having a repeating unit represented by the following formula

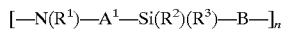

wherein
$R^1$, $R^2$ and $R^3$ are the same or different and each is a hydrogen atom or a lower alkyl group;
$A^1$ is a lower alkylene group which may be substituted by a lower alkyl group, a group represented by the formula —$A^2$—N($R^4$)—$A^3$— or a group represented by the formula —$A^2$—N($R^4$)—$A^3$—N($R^5$)—$A^4$—, wherein $A^2$, $A^3$ and $A^4$ are the same or different and each is a lower alkylene group which may be substituted by a lower alkyl group;
$R^4$ and $R^5$ are the same or different and each is a hydrogen atom or a lower alkyl group;
B is a lower alkylene group which may be substituted by a lower alkyl group; and n is an integer of not less than 2, and a strong acid.

In the composite of the present invention, a strong acid is retained in the polysilamine by a chemical bond, and thus, it is easy to handle the composite as is the case with a solid electrolyte membrane while the proton conductivity is maintained as is the case with the strong acid alone.

In the present invention, the polysilamine is preferably crosslinked by means of a crosslinking agent.

Also, in the present invention, the composite preferably contains 0.05 to 2 mol of a strong acid per mol of the amino group and, in addition, preferably has a proton conductivity at 100° C. of not less than $10^{-6}$ S/cm.

Another aspect of the present invention provides an electrolyte membrane formed from the composite in the shape of a membrane.

Still another aspect of the present invention provides a fuel cell having a plurality of unit cells, each unit cell having the aforementioned electrolyte membrane and a pair of electrodes holding the electrolyte therebetween.

DETAILED DESCRIPTION OF THE INVENTION

Figure 1:
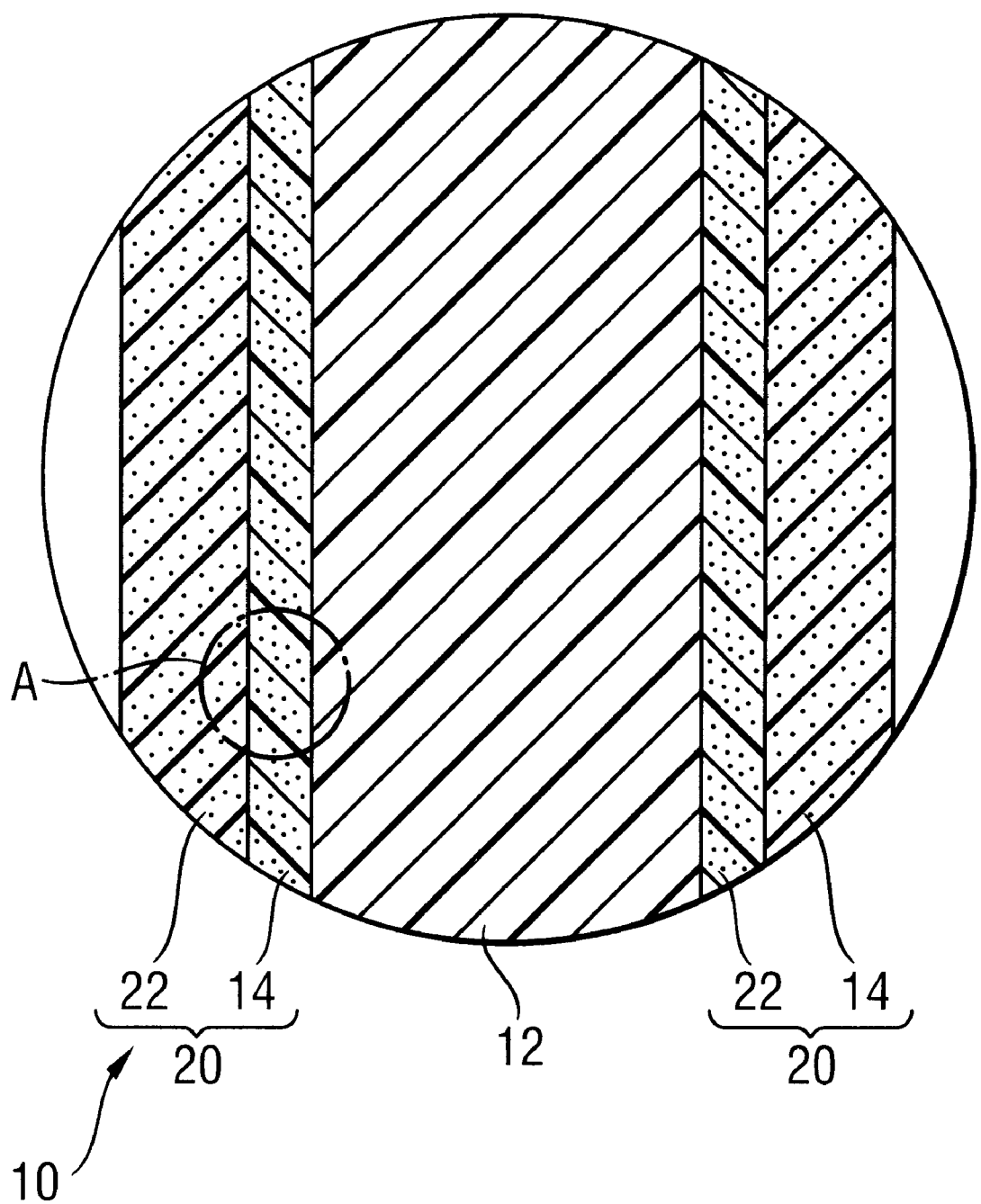
FIG. 1 is an explanatory cross-sectional view of a unit cell of a fuel cell.

In the composite of the present invention, a polysilamine having a repeating unit represented by the following formula

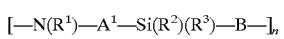

wherein
R$^1$, R$^2$, R$^3$, A$^1$, B and n are the same as defined above, is used.

More specifically, depending on A1, the aforementioned formula includes three embodiments as follows:

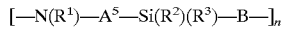

wherein
R$^1$, R$^2$, R$^3$, A$^1$, B and n are the same as defined above; and
A$^5$ is a lower alkylene group which may be substituted by a lower alkyl group;

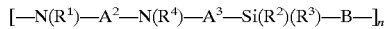

wherein
R$^1$, R$^2$, R$^3$, R$^4$, A$^2$, A$^3$, B and n are the same as defined above; and

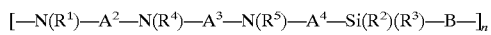

wherein
R$^1$, R$^2$, R$^3$, R$^4$, R$^5$, A$^2$, A$^3$, A$^4$, B and n are the same as defined above.

The term "polysilamine" as used herein is not limited to a polymer and includes an oligomer thereof The polysilamine may be a solid, a liquid or a gel depending on the degree of polymerization, temperatures, etc.

The term "lower" as used herein refers to having 1 to 6 carbon atoms unless otherwise stated, and the term "lower alkyl group" as used herein refers to an alkyl group having 1 to 6 carbon atoms and includes a methyl group, an ethyl group, a propyl group, an isopropyl group, a butyl group, a 2-methyl-propyl group, a pentyl group, a hexyl group, etc. The lower alkyl group preferably has 1 to 3 carbon atoms.

The term "lower alkylene group" as used herein refers to an alkylene group having 1 to 6 carbon atoms, and a group represented by the formula —(CH$_2$)$_p$— (wherein p is an integer of 1 to 6) and includes, for example, a methylene group, an ethylene group, a propylene group, a butylene group, etc. The lower alkylene group more preferably has 1 to 3 carbon atoms.

R$^1$, R$^2$ and R$^3$ are the same or different and each is preferably a lower alkyl group and more preferably an alkyl group having 1 to 3 carbon atoms.

A$^1$ is preferably a lower alkylene group or a group of the formula —A$^2$—N(R$^4$)—A$^3$— and more preferably an alkylene group having 1 to 3 carbon atoms.

A$^2$, A$^3$ and A$^4$ are the same or different and each is preferably a lower alkylene group and more preferably an alkylene group having 1 to 3 carbon atoms.

R$^4$ and R$^5$ are preferably the same or different and each is preferably a lower alkyl group.

B is preferably a lower alkylene group and more preferably an alkylene group having 1 to 3 carbon atoms.

n is preferably an integer of 2 to 1000 and more preferably an integer of 2 to 500.

Further, n may be an integer of 2 to 100 or an integer of 2 to 50.

Now the preparation of the polysilamine will be described.

A polysilamine represented by formula (III) can be prepared by reacting a primary amine represented by formula (I) with a silicon compound represented by formula (II) in the presence of a base at room temperature or upon heating.

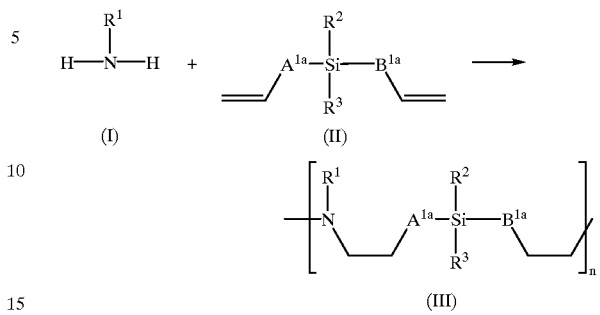

In the aforementioned formulae, R$^1$, R$^2$, R$^3$ and n are the same as defined; A$^{1a}$ is a direct bond, a lower alkylene group which may be substituted by a lower alkyl group, a group of the formula —A$^{2b}$—N(R$^4$)—A$^3$— or a group of the formula —A$^{2b}$—N(R$^4$)—A$^3$—N(R$^5$)—A$^4$— (wherein A$^3$, A$^4$, R$^4$ and R$^5$ are the same as defined above; A$^{2b}$ is a direct bond or a lower alkylene group which may be substituted by a lower alkyl group); B$^{1a}$ is a direct bond or a lower alkylene group which may be substituted with a lower alkyl group.

The hydrogen atom directly bonded to the N atom is reacted with the carbon-carbon double bond to effect polymerization.

Further, together with the primary amine represented by formula (I), a small amount of ammonia may be added, and the polymer chain of the polysilamine may have branches.

As the base, a strong base such as an alkyl lithium can be preferably used. Also, the polysilamine represented by formula (V) can be prepared by reacting a primary amine represented by formula (I) with a silicon compound represented by formula (IV) in the presence of a base at room temperature or upon heating.

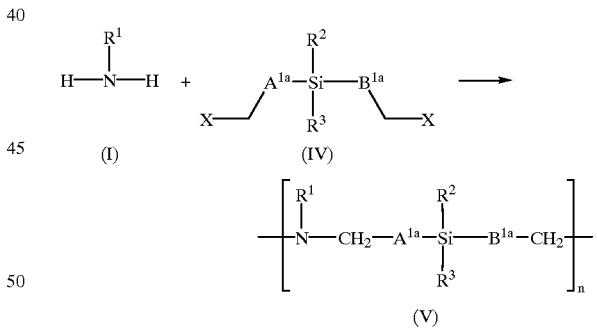

In the aforementioned formulae, R$^1$, R$^2$, R$^3$, A$^{1a}$, B$^{1b}$ and n are the same as defined above; X is a halogen atom or an eliminating group such as a tosylate and the term "halogen" as used herein refers to a fluorine, a chlorine, a bromine or an iodine. As the base, the aforementioned base can be preferably used.

Furthermore, a polysilamine represented by formula (VIII) can be prepared by reacting a diamine represented by formula (VI) with a silicon compound represented by formula (VII) in the presence of a base at room temperature or upon heating.

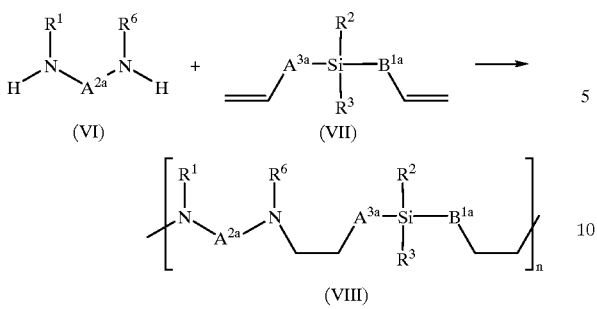

(VI)     (VII)

(VIII)

In the aforementioned formulae, $R^1$, $R^2$, $R^3$, $B^{1a}$ and n are the same as defined above; $A^{2a}$ is $A^2$ or a group represented by the formula $-A^2-N(R^4)-A^3-$; $A^{3a}$ is a direct bond or a lower alkylene group which may be substituted by a lower alkyl group.

As the base, the aforementioned base can preferably be used.

Further, together with the diamine represented by formula (VI), the primary amine represented by formula (I) may be added. Also, together with the diamine represented by formula (VI), a small amount of ammonia may be added, and the polymer chain of the polysilamine may have branches.

A polysilamine represented by formula (X) can be prepared by reacting the diamine represented by formula (VI) with a silicon compound represented by formula (IX) in the presence of a base at room temperature or upon heating.

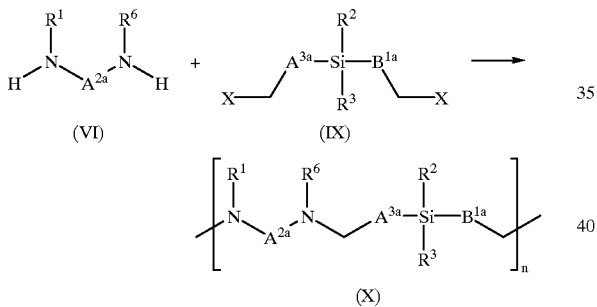

(VI)     (IX)

(X)

In the aforementioned formulae, $R^1$, $R^2$, $R^3$, $R^6$, $A^{2a}$, $A^{3a}$, $B^{1a}$ and n are the same as defined above.

As the base, the aforementioned base can preferably be used.

Further, together with the diamine represented by formula (VI), the primary amine represented by formula (I) may be added. Also, together with the diamine represented by formula (VI), a small amount of ammonia may be added, and the polymer chain of the polysilamine may have branches.

Furthermore, the polysilamine is preferably crosslinked with a crosslinking agent. For example, the polysilamine represented by formula (III), (V), (VIII) or (X) can be reacted with a crosslinking agent. Even when the polysilamine is a liquid or a gel, the polysilamine can be solidified or gelatinized by crosslinking with a crosslinking agent. When the polysilamine is a gel or a solid, a crosslinking agent is not necessarily used.

The crosslinking agent is preferably an organic compound having not less than two epoxy groups and more preferably an organic compound having not less than three epoxy groups. The epoxy groups react with the amino groups, particularly primary or secondary amino groups in the polysilamine.

The organic compound having not less than two epoxy groups includes, for example, an epoxy compound represented by formula (XI). Further, the hydrogen atoms in the epoxy groups of the epoxy compound represented by formula (I) may be substituted by a halogen or a lower alkyl group.

(XI)

In the aforementioned formula $R^7$ is a hydrocarbon group, including, for example, a linear chain or branched lower alky-lene group which may be substituted by a halogen atom, an oxygen atom, an epoxy group or an aryl group or a linear chain or branched lower alkoxyl group which may be substituted with a halogen atom, an oxygen atom, a epoxy group or an aryl group; and as the aryl group, a phenyl group, a naphthalenyl group and an indenyl group can be mentioned. Examples of $R^7$ include the following groups.

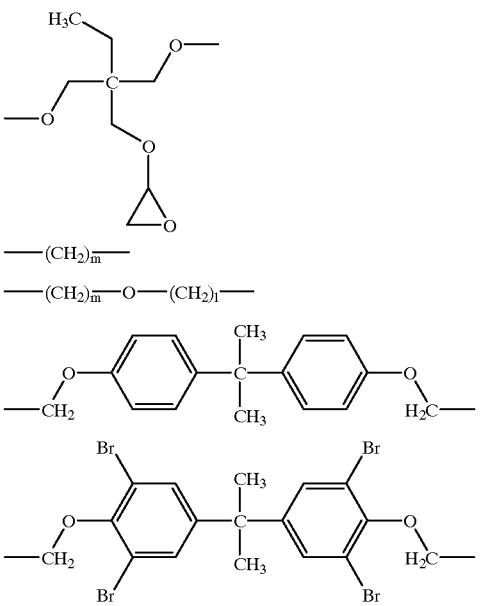

In the aforementioned formulae, m and l are the same or different and each is an integer of 1 to 6.

For example, the epoxy compound represented by formula (XI) is reacted with an amine compound represented by formula (MI) to form an aminoalcohol represented by formula (XIII).

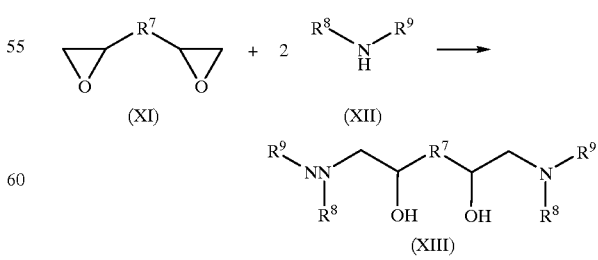

(XI)     (XII)

(XIII)

In the aforementioned formulae, $R^7$ is the same as defined above; Rs and $R^9$ are the same or different and show polymer chains of the polysilamine.

A further aspect of the present invention provides a composite of the aforementioned polysilamine and a strong acid. The strong acid forms an acid-base interaction or a hydrogen bond with the nitrogen atom in the repeating unit of the polysilamine to impart proton conductivity. Typically, as an amounts of the strong acid in the composite increases, the proton conductivity increases.

The composite of the present invention preferably has a proton conductivity at 100° C. of not less than $1 \times 10^{-6}$ S/cm, more preferably not less than $5 \times 10^{-5}$ S/cm. A composite can be prepared by reacting a polysilamine with a strong acid. The composite may or may not be crosslinked. Alternatively, a composite containing a non-crosslinked polysilamine and a strong acid may be reacted with the aforementioned crosslinking agent to crosslink the polysilamine portion in the composite.

As the strong acid, phosphoric acid and sulfuric acid are preferred, and phosphoric acid is more preferred. The term "phosphoric acid" as used herein includes orthophosphoric acid ($H_3PO_4$), diphosphoric acid ($H_4P_2O_7$), and metaphosphoric acid [$(HPO_3)_r$(wherein r is an integer of not less than 3)].

The composite of the present invention preferably contains 0.05 to 2 mol of a strong acid per mol of amino group in the repeating unit, more preferably 0.1 to 1 mol of a strong acid and most preferably 0.15 to 0.8 mol of a strong acid. When the composite contains less than 0.05 mol of a strong acid per mol of amino group in the repeating unit, it is impossible to impart sufficient proton conductivity. Also, it is difficult to incorporate more than 2 mol of a strong acid per mol of amino group in the repeating unit. The content of the strong acid in the composite can be controlled by varying the ratio of the polysilamine to the strong acid in the preparation of the composite.

The reaction of the polysilamine to the strong acid may be carried out either under cooling or at room temperature or upon heating. The composite of the present invention has a heat resistance of, for example, about 200° C.

A reaction of producing a composite in case of orthophosphoric acid as the strong acid is shown below.

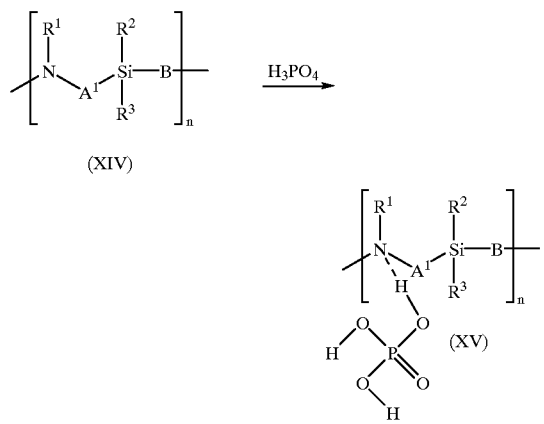

In the aforementioned formulae, $R^1$, $R^2$, $R^3$, $A^1$, B and n are the same as defined above.

The polysilamine represented by formula (XIV) forms a composite represented by formula (XV) by the reaction with orthophosphoric acid. An acid-base interaction or a hydrogen bond is formed between the hydroxyl group of the orthophosphoric acid and the nitrogen atom in the repeating unit of the polysilamine.

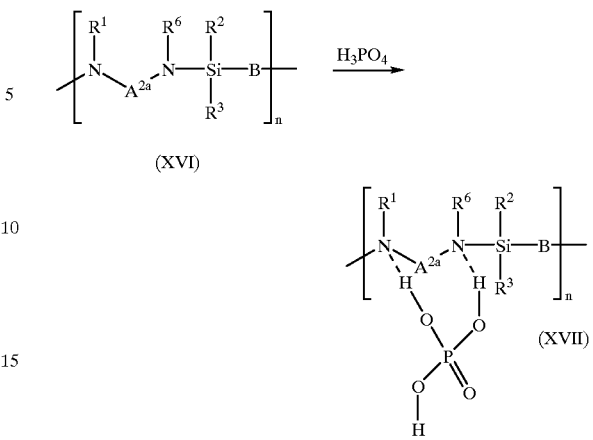

In the aforementioned formulae, $R^1$, $R^2$, $R^3$, $A^{2a}$, B and n are the same as defined define above.

The polysilamine represented by formula (XIV) forms a composite represented by formula (XVII) by the reaction with orthophosphoric acid. The repeating unit of the polysilamine represented by formula (XVI) contain as least two nitrogen atoms, and an acid-base interaction or a hydrogen bond is formed between these two nitrogen atoms and the two hydroxyl groups of orthophosphoric acid in some cases.

The composite of the present invention, which is proton-conductive, can suitably be used as the electrolyte of cells. This composite can be used not only as the electrolyte of cells but also that of display elements, electrochromic elements and various sensors. Further, it can be used as a dispersing agent, an emulsifier, a water treating agent, a water holding agent, a thickener, a fiber treating agent and an ion exchange resin.

Further, according to another aspect of the present invention, an electrolyte membrane formed of the composite in the shape of a membrane is provided. Such an electrolyte membrane can suitably be used for a unit cell of a fuel cell.

In FIG. 1, a unit cell 10 of a fuel cell has an electrolytic membrane 12 and a pair of electrodes 20 holding the electrolytic membrane 12 therebetween. The electrode 20 has a catalyst layer 14 for carrying out electrode reaction and a gas diffusion layer 22 for supplying a reactant gas to this catalyst layer 14.

Figure 2:
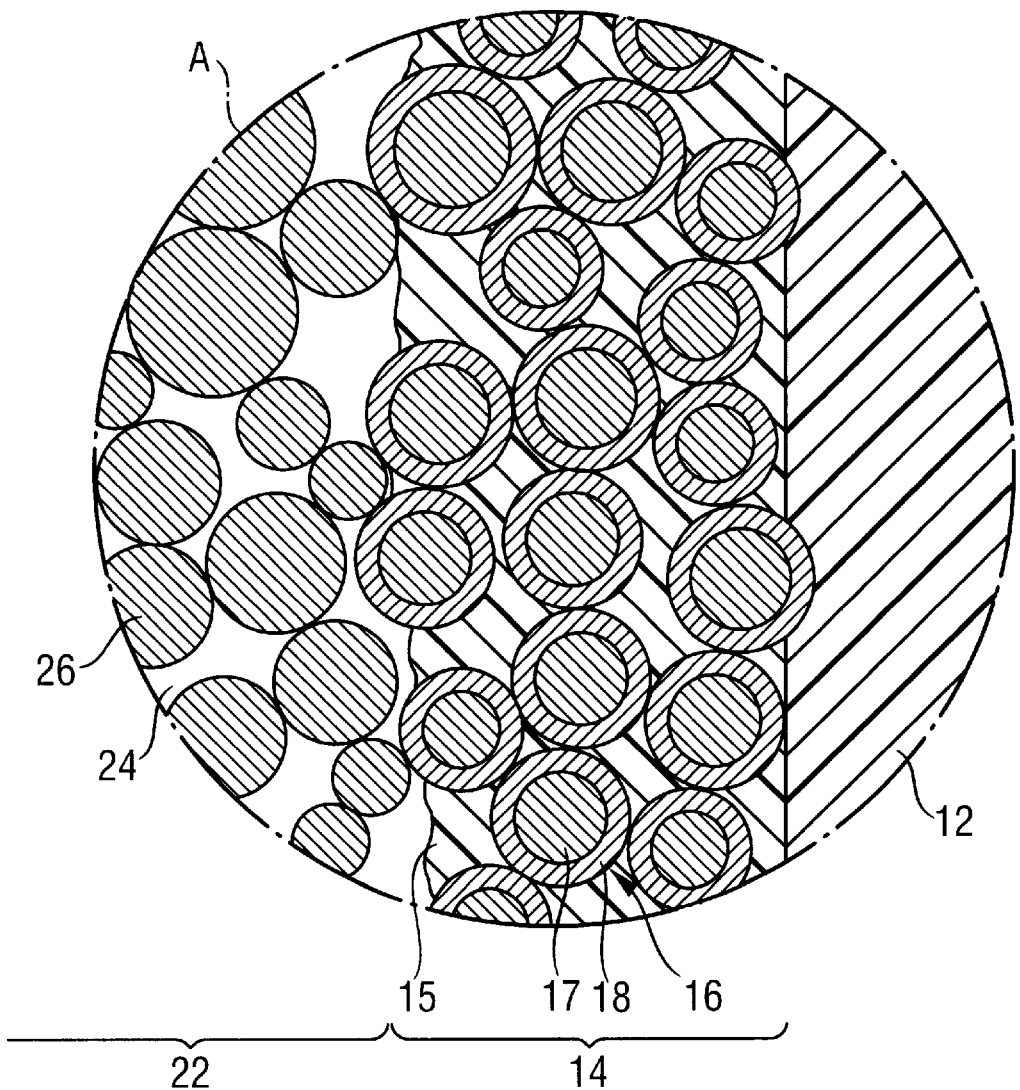
FIG. 2 is an enlarged cross-sectional view of A in FIG. 1.

In FIG. 2, the catalyst layer 14 has a matrix 15 composed of an electrolyte membrane and at least two catalyst particles 16 dispersed in this matrix. The matrix 15 forms a hydrogen ion conduction channel with the electrolyte membrane 12. The material of the matrix 15 is preferably the same as that of the electrolyte membrane 12. These materials, however, may be different from each other. The matrix 15 may be porous so that the reaction gas passes therethrough. The catalyst particles 16 are preferably in contact with one another and forms an electron conduction channel. Each catalyst particle 16 has a conductive carrier 17 and a catalyst substance 18 supported on the surface of the conductive carrier 17. As the conductive carrier 17, for example, carbon particles are used. As the catalyst substance 18, platinum element, a platinum-based alloy, etc. are used. In FIG. 2, the catalyst substance 18 is coated onto the surface of the conductive carrier 17. However, the catalyst substance 18 may be in the shape of particles.

The gas diffusion layer 22 is porous so as to allow a reaction gas to diffuse. In FIG. 2, the gas diffusion layer 22 is composed of at least.two conductive particles 26 forming a gap 24. As the conductive particles 26, for example, carbon particles are used, and the conductive particles 26 may be the same as the conductive carrier 17. Further, instead of the conductive particles 26, a conductive substance such as carbon fiber may be used.

The composite of the present invention can be used as the electrolyte membrane 12. Further, a unit cell precursor having the electrolytic membrane 12 and one or both catalyst layers 14 can be prepared. In addition, by fixing such a precursor to the gas diffusion layer 22 a unit cell can be prepared.

The following examples are provided for illustrative purposes only, and are not intended to limit the scope of the invention.

The infrared spectrum was measured by using SHIMADZU FT-IR 8000 and the measurement of $^1$H-NMR was carried out at the Engineering Department of Science University of Tokyo.

In the thermogravimetric analysis-differential thermal analysis(hereinafter referred to "TG-DTA"), TG-DTA 200 manu-factured by Seiko Instruments Inc. was used.

As the power source, DC VOLTAGE STANDARD TYP 2851 was used. In the measurement of conductivity, an impedance analyzer YHP 41922ALE was used.

Reference Example

In Reference Example a polysilamine was prepared.
(1) Preparation of Reagents

With regard to N,N'-diethylenediamine (DEDA), a commercially available reagent was used as it is.

With regard to dimethyl divinylsilane (DVS), a commercially available reagent was refluxed upon heating for three hours and purified by distillation under an ambient atmosphere, and a fraction of 82° C. was used.

With regard to n-butyl lithium (n-BuLi), a commercially available reagent was used as it is.

With regard to tetrahydrofuran (THF), a guaranteed reagent commercially available from Wako Pure Chemical Co., Ltd. was purified by distillation under an ambient pressure, and a fraction of 65° C. was used.

With regard to diethyl ether, a guaranteed reagent available from Wako Pure Chemical Co., Ltd. was used as it is.
(2) Preparation of Polysilamine The ratio of N,N'-diethyl ethylenediamine to dimethyl vinylsilane to be charged was set to 21:20 so that the degree of polymerization of the polysilamine to be obtained was 20. The amount of n-BuLi was set to 1/21 of N,N'-diethyl ethylenediamine to obtain a degree of polymerization of 20 and the amount of THF was such that the concentration of N,N'-diethyl ethylenediamine was 1 mol/l.

To 500 ml eggplant-shape flask were added 342 ml of THF, 49.3 ml (0.342 mol) of N,N'-diethyl ethylenediamine and 10.3 ml (0.016 mol) of n-BuLi by a syringe and stirred at 60° C. in an argon atmosphere for 10 minutes to prepare N,N'-diethyl-N-lithio-ethylenediamine. To this solution, 50.7 ml (0.325 mol) of dimethylvinylsilane were added and subjected to anion polymerization at 60° C. in an argon atmosphere for 24 hours with stirring. This reaction formula is shown below.

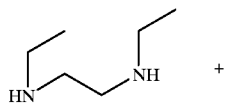

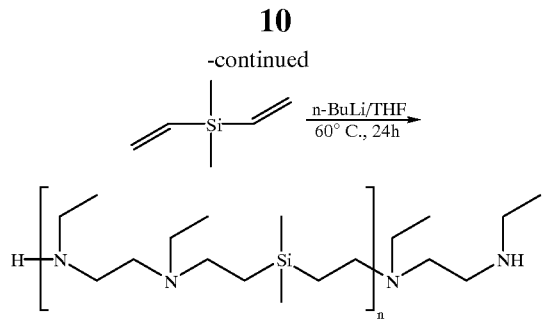

Figure 3:
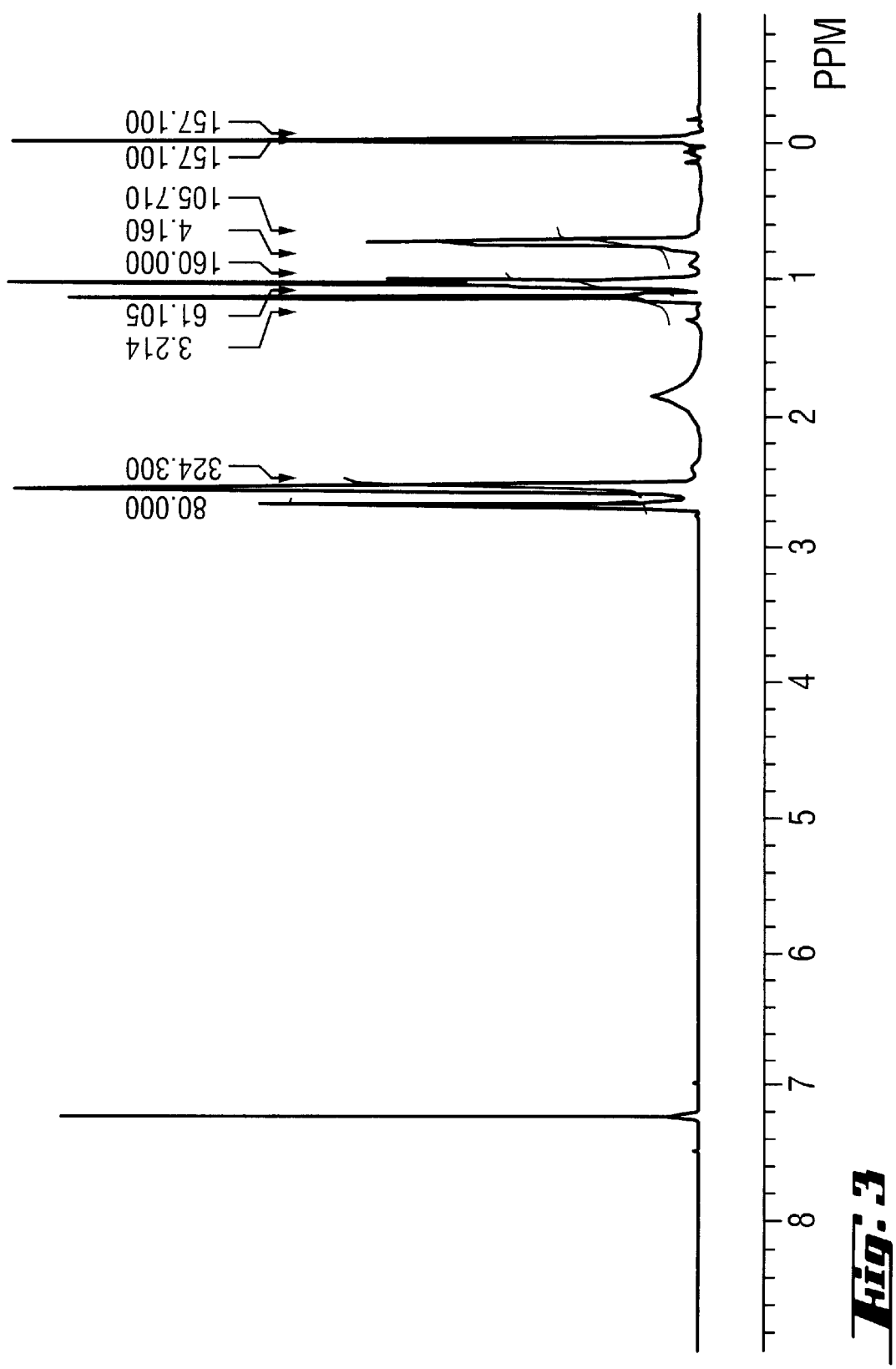
FIG. 3 is a $^1$H-NMR spectrum of a polysilamine in CDC$\lambda_3$.

In order to prepare a polysilamine having amino groups at both terminals, $^1$H-NMR was measured, and the reaction continued unitl the peak attributed to the vinyl group at 6 ppm disappeared. After stirring for 24 hours, a small amount of a sample was taken to a screw tube by a syringe to terminate the reaction with methanol, and the peak attributed to the vinyl group at 6 ppm was observed by the measurement of $^1$H-NMR. The peak for the vinyl group at 6 ppm was not observed in the $^1$H-NMR spectrum and accordingly, N,N'-diethyl ethylenediamine and n-BuLi each in an amount of 5.0 ml were added, and the reaction was further continued at 60° C. in an argon atmosphere for 24 hours with stirring. After 24 hours, $^1$H-NMR was measured in the same manner as described above. On repeating this procedure five times, the peak for the vinyl group at 6 ppm disappeared. This $^1$H-NMR spectrum is shown in FIG. 3.

Figure 4:
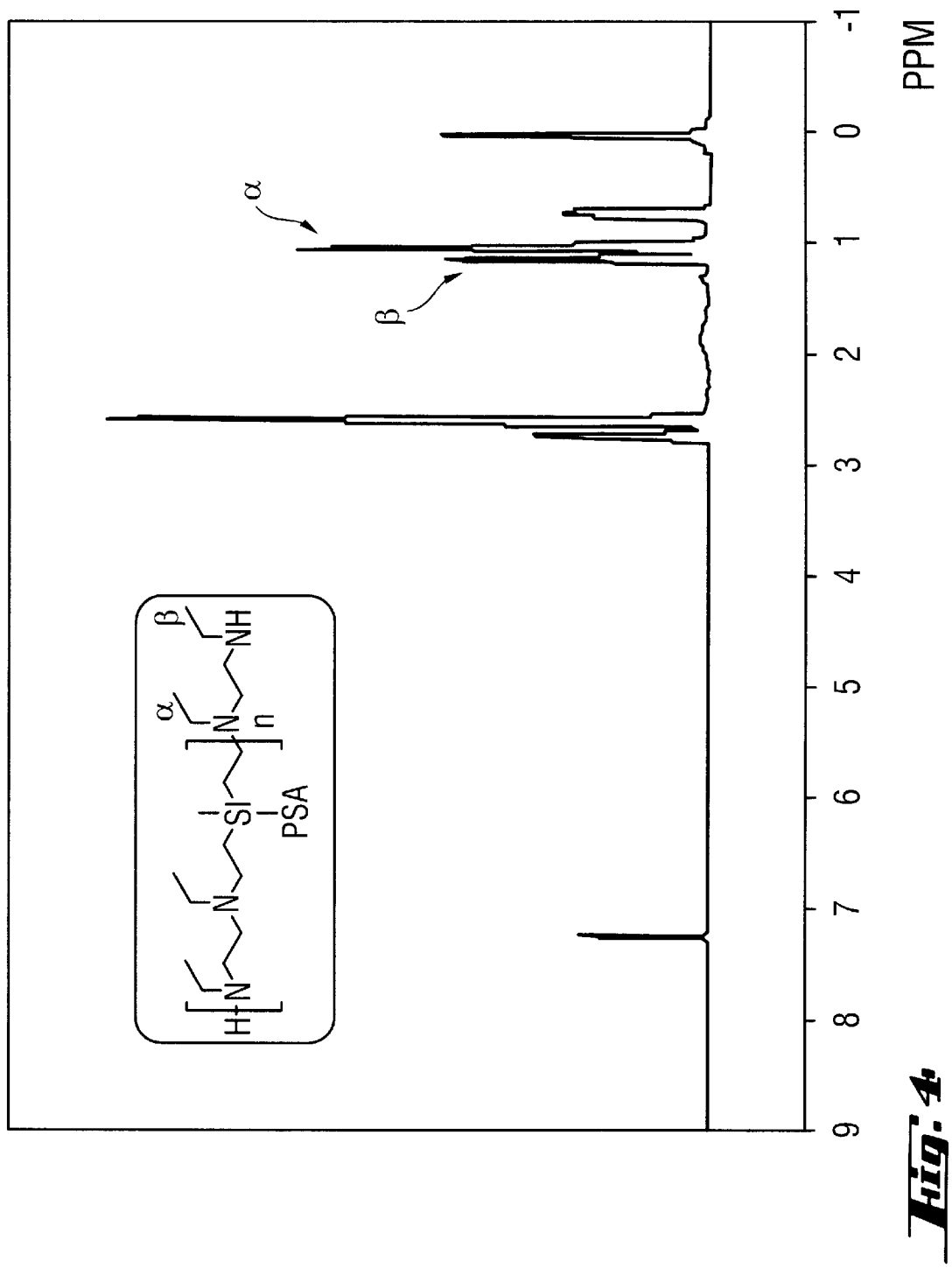
FIG. 4 is a $^1$H-NMR spectrum of another polysilamine in CDC$\lambda_3$.

Then, methanol was added ten times as the amount of n-BuLi to terminate the reaction and as a result, a brown polysilamine/THF solution was obtained. The solvent was removed from this solution by an evaporator and further by a vacuum evaporator to completely remove the solvent, unreacted N,N'-diethyl ethylenediamine and dimethylvinylsilane. Subsequently, the remaining was extracted with ether, and the extract was washed with an aqueous solution of NaOH having a pH of 9 to 10. The ether phase was dried by adding anhydrous magnesium sulfate thereto and stirring the mixture for one day, and the solvent was removed by an evaporator and the remaining was dried under a reduced pressure to obtain a yellow, transparent, viscous, and purified polysilamine.
(3) Identification of Polysilamine by $^1$H-NMR The purified polysilamine was dissolved in deuterated chloroform (CDCl$_3$), and the $^1$H-NMR spectrum was measured. This spectrum is shown in FIG. 4.

The ratio of the integrated values of peak α to peak β shows the that weight average molecular weight Mw was found 733.
(4) Identification of Polysilamine by FT-IR The polysilamine was put between a pair of KBr plates, and the infrared spectrum was measured in a nitrogen atmosphere at room temperature in the range of 650 cm$^{-1}$ to 4000 cm$^{-1}$ with the use of SHIMADZU FT-IR 8000.

EXAMPLE 1

In Example 1, a composite of a polysilamine and phosphoric acid was prepared.
(1) Preparation of Reagents With the polysilamine, a yellow, transparent viscous polysilamine having a molecular weight of 2000 provided by Prof. Nagasaki of Science University of Tokyo was used as it is.

With methanol, an extra pure reagent commercially available from Wako Pure Chemical Co., Ltd. was purified by distillation under an ambient pressure and a fraction of 64.5° C. was used.

With phosphoric acid, a guaranteed reagent commercially available from Wako Pure Chemical Co., Ltd. was used as it is.

(2) Preparation Composite of Polysilamine and Phosphoric Acid

Three types of composites having different contents of phosphoric acid per unit of the polysilamine were prepared. The reaction formula is shown below.

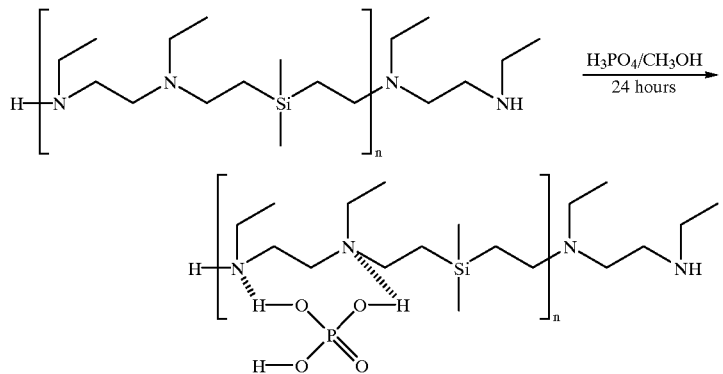

2-1 Polyamine/Phosphoric Acid (1:1) Composite

To 300 ml four-necked flask were added 1.0 g (4.4 mmol) of the polysilamine and 30 ml of the purified methanol and stirred by a three-one-motor in a nitrogen atmosphere at room temperature for two hours. Phosphoric acid was added dropwise from a dropping funnel in an amount of 0.63 cm$^3$ (4.4 mmol) equivalent to the amount of the polysilamine monomer, and the resultant mixture was stirred for 24 hours. The white solid thus formed was scraped out with a spatula and dried overnight under a reduced pressure of 3 mmHg.

2-2 Polysilamine/Phosphoric Acid (2:1) Composite

To 100 ml four-necked flask were added 0.48 g (2.2 mmol) of the polysilamine and 15 ml of the purified methanol and stirred by a three-one-motor in a nitrogen atmosphere at room temperature for two hours. 0.15 cm$^3$ (1.1 mmol) of phosphoric acid was added dropwise from a dropping funnel, and the resultant mixture was stirred for 24 hours. The solution thus formed was transferred to a 50 ml eggplant-shape flask, and the methanol content was removed by an evaporator and the remaining was dried overnight under a reduced pressure of 2 mmHg.

2-3 Polysilamine/Phosphoric Acid (1:2) Composite

To 200 ml four-necked flask were added 0.99 g (4.3 mmol) of the polysilamine and 30 ml of the purified methanol and stirred by a three-one motor in a nitrogen atmosphere at room temperature for two hours. 1.24 cm$^3$ (8.6 mmol) of phosphoric acid were added dropwise from a dropping funnel, and the resultant mixture was stirred for 24 hours. The white solid thus formed was scraped out and dried overnight under a reduced pressure of 2 mmHg.

Figure 5:
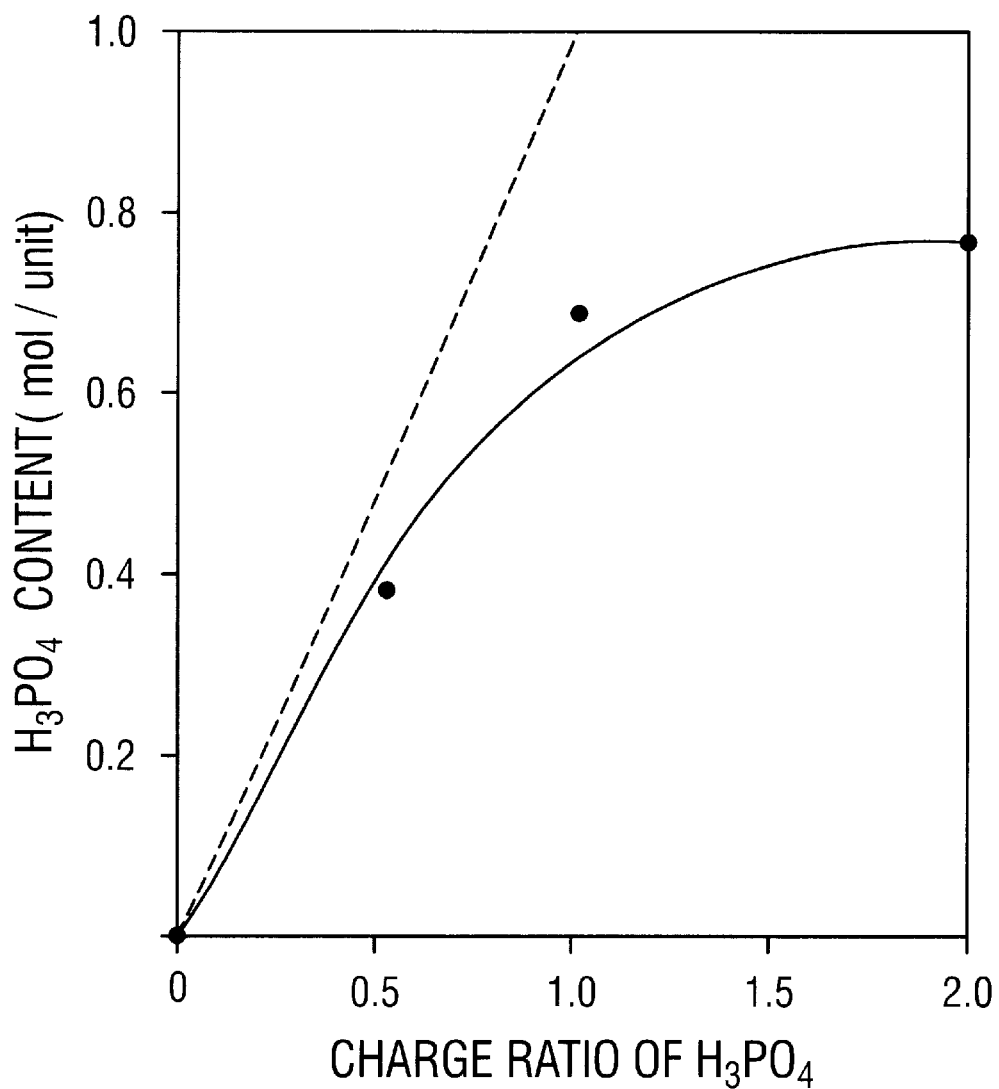
FIG. 5 is a graph showing a content of phosphoric acid versus the charge ratio of phosphoric acid.

The content of phosphoric acid in the composite could be controlled by changing the ratio of the polysilamine to the phosphoric acid in the preparation. The elemental analysis of the composite determined the content of phosphoric acid. It was found that the polysilamine/phosphoric acid (2:1) composite contained 0.4 mol of phosphoric acid per unit of polysilamine; the polysi-lamine/phosphoric (1:1) composite contained 0.7 mol of phosphoric acid per unit of polysilamine; and the polysilamine/phosphoric acid (1:2) composite contained 0.8 mol of phosphoric acid per unit of polysilamine. In FIG. 5, the content of phosphoric acid versus the charge ratio of phosphoric acid is shown. With the composite the solubility test was carried out. The results are shown in Table 1.

TABLE 1

|  | | PSA | PSA/H$_3$PO$_4$ | Eportor |
|---|---|---|---|---|
| large | H$_2$O | X | ○ | X |
|  | DMSO | X | X | ○ |
|  | DMAc | ○ | X | ○ |
|  | NMP | ○ | X | ○ |
| Permittivity | DMF | ○ | X | ○ |
|  | MeOH | ○ | X | ○ |
|  | Acetone | ○ | X | ○ |
|  | THF | ○ | X | ○ |
|  | Chloroform | ○ | X | ○ |
| small | N-Hexane | ○ | X | X |

These composites did not show solubility in a solvent except for water. Accordingly, membranes could not be formed by the casting membrane method.

(3) Identification of Composite by FT-IR

Figure 6:
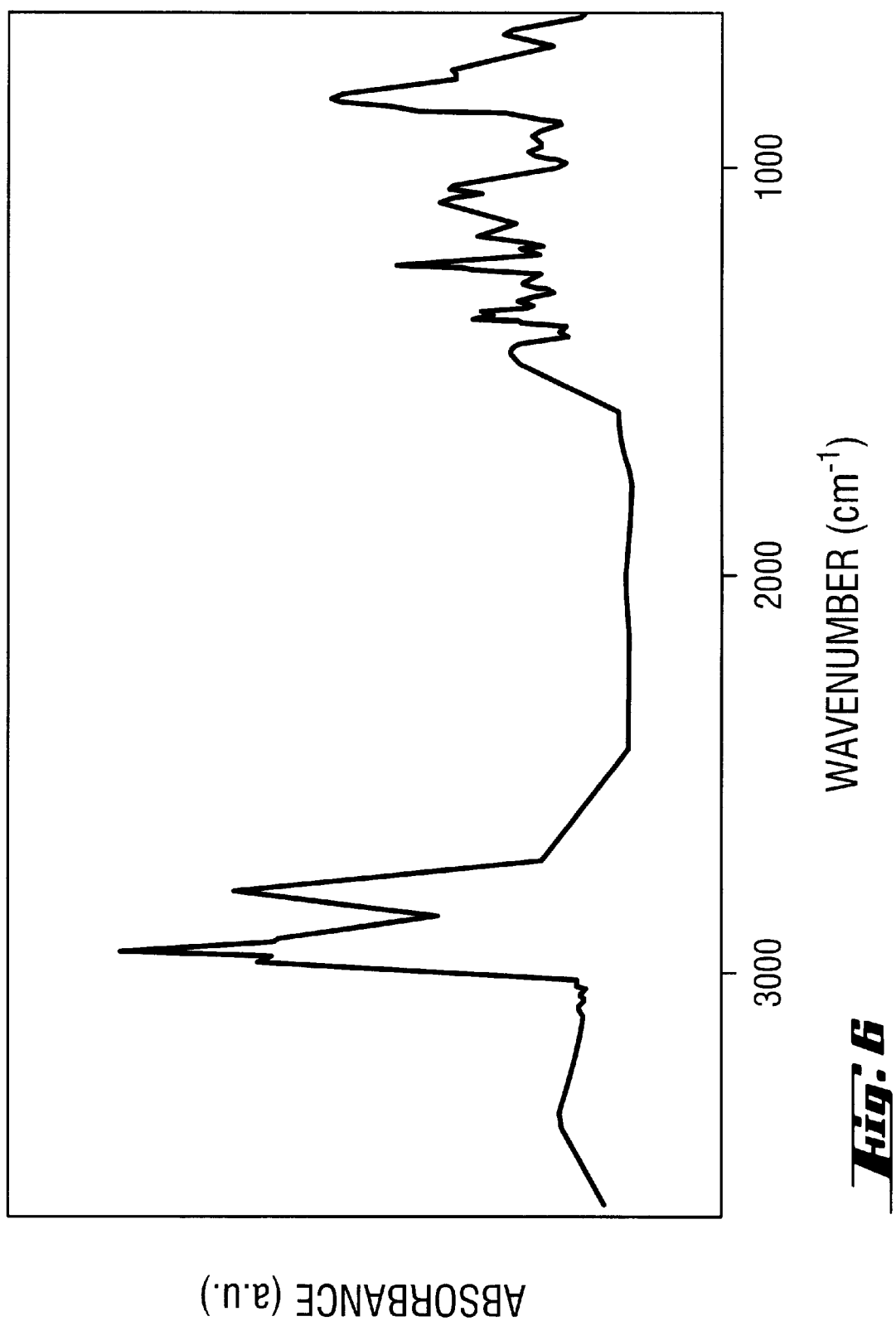
FIG. 6 is an FT-IR spectrum of a polysilamine.
Figure 7:
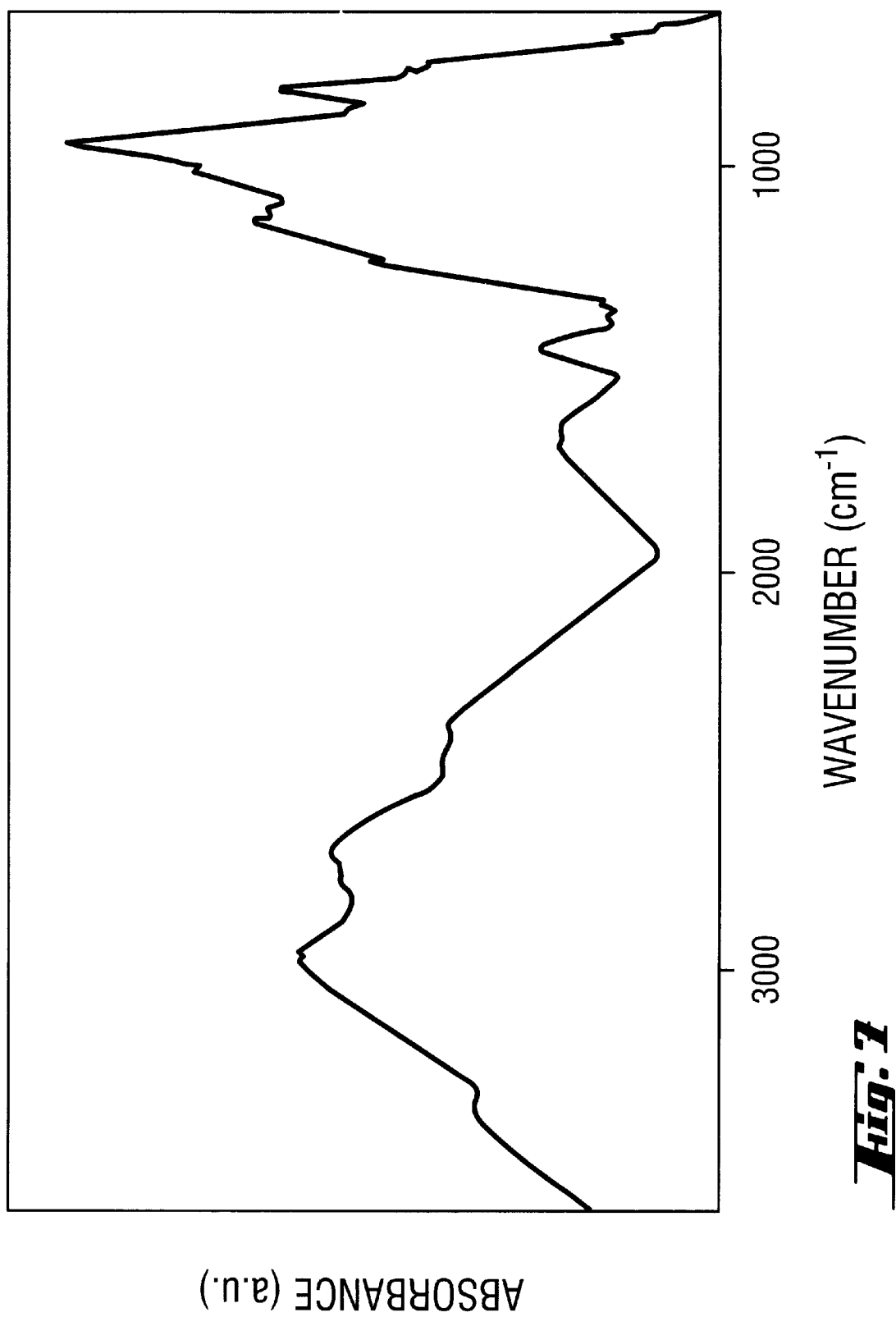
FIG. 7 is an FT-IR spectrum of a composite of a polysilamine and phosphoric acid.

KBr was used as a standard sample, and a dry sample of the composite was molded into a pellet and the infrared spectrum was measured in a nitrogen atmosphere at room temperature in the range of 650 cm$^{-1}$ to 3600 cm$^{-1}$ with the use of SHIMADZU FT-IR 8000. Subsequently, this spectrum was compared to that of the polysilamine. The FT-IR spectrum of the polysilamine and that of the composite are shown in FIG. 6 and FIG. 7, respectively.

The spectrum of the composite shows a strong peak at 900 to 1250 cm$^{-1}$ attributed to phosphoric acid and accordingly, the results confirm that the composite contained phosphoric acid.

The spectrum of the polysilamine shows an absorption due to the stretching vibration of C—N at 1457 cm$^{-1}$. However, the spectrum of the composite show that this absorption shifted to 1469 cm$^{-1}$. Further, an absorption at 2800 to 3000 cm$^{-1}$ appeared in the polysilamine. The absorption attributed to alkyl group came to a broad absorption in the composite. Compared to the polysilamine, a peak appeared at 3393 cm$^{-1}$ in the composite and this peak is regarded as the absorption by NH derived from the N of the polysilamine and the OH of phosphoric acid. The results confirm that a composite was formed by the acid-base interaction between the amino group of the polysilamine and the hydroxyl group of the phosphoric acid.

(4) Thermal Analysis (Evaluation of Heat Resistance)

Figure 8:
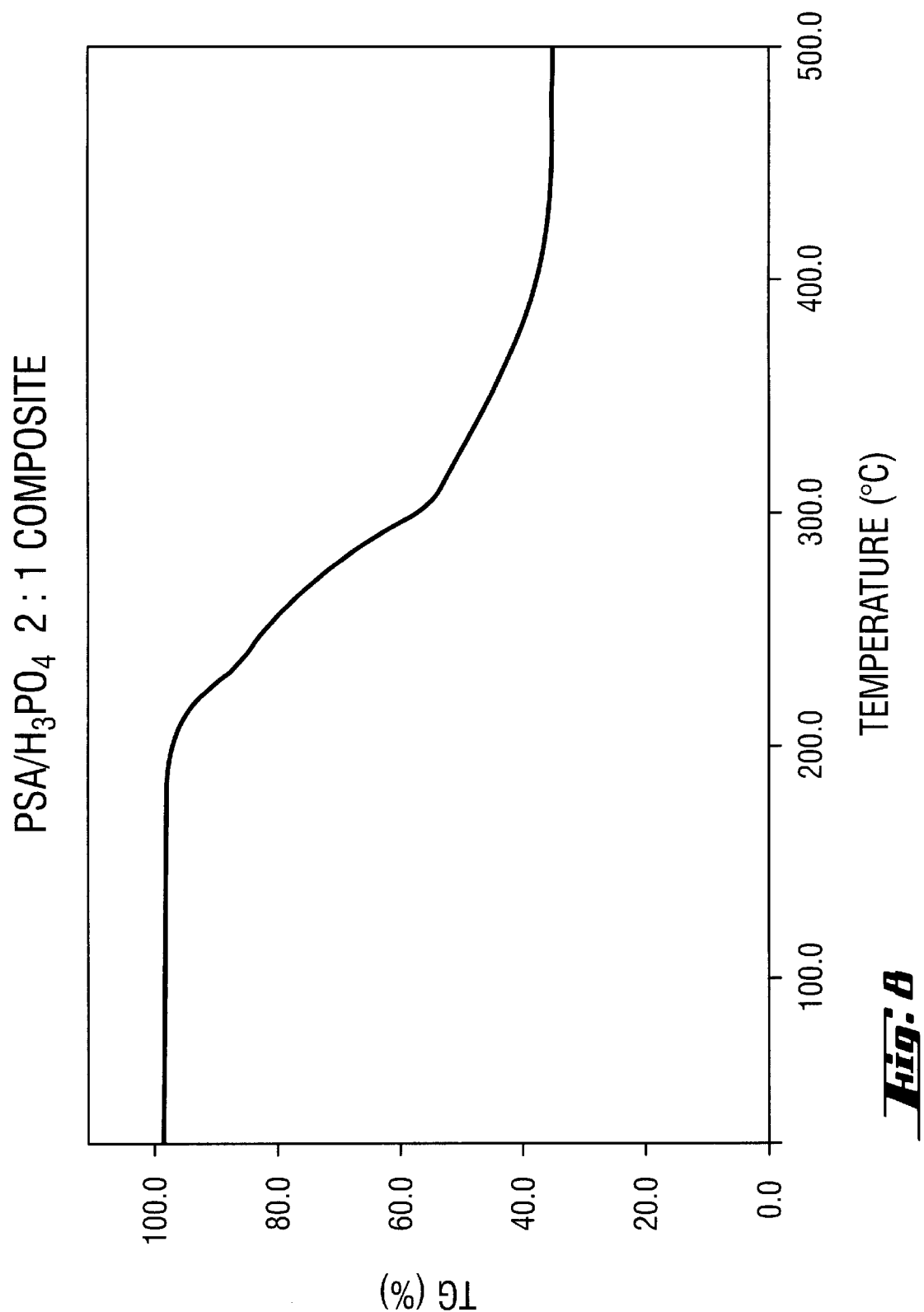
FIG. 8 is a TG-DTA spectrum of a polysilamine/phosphoric acid (2:1) composite.
Figure 9:
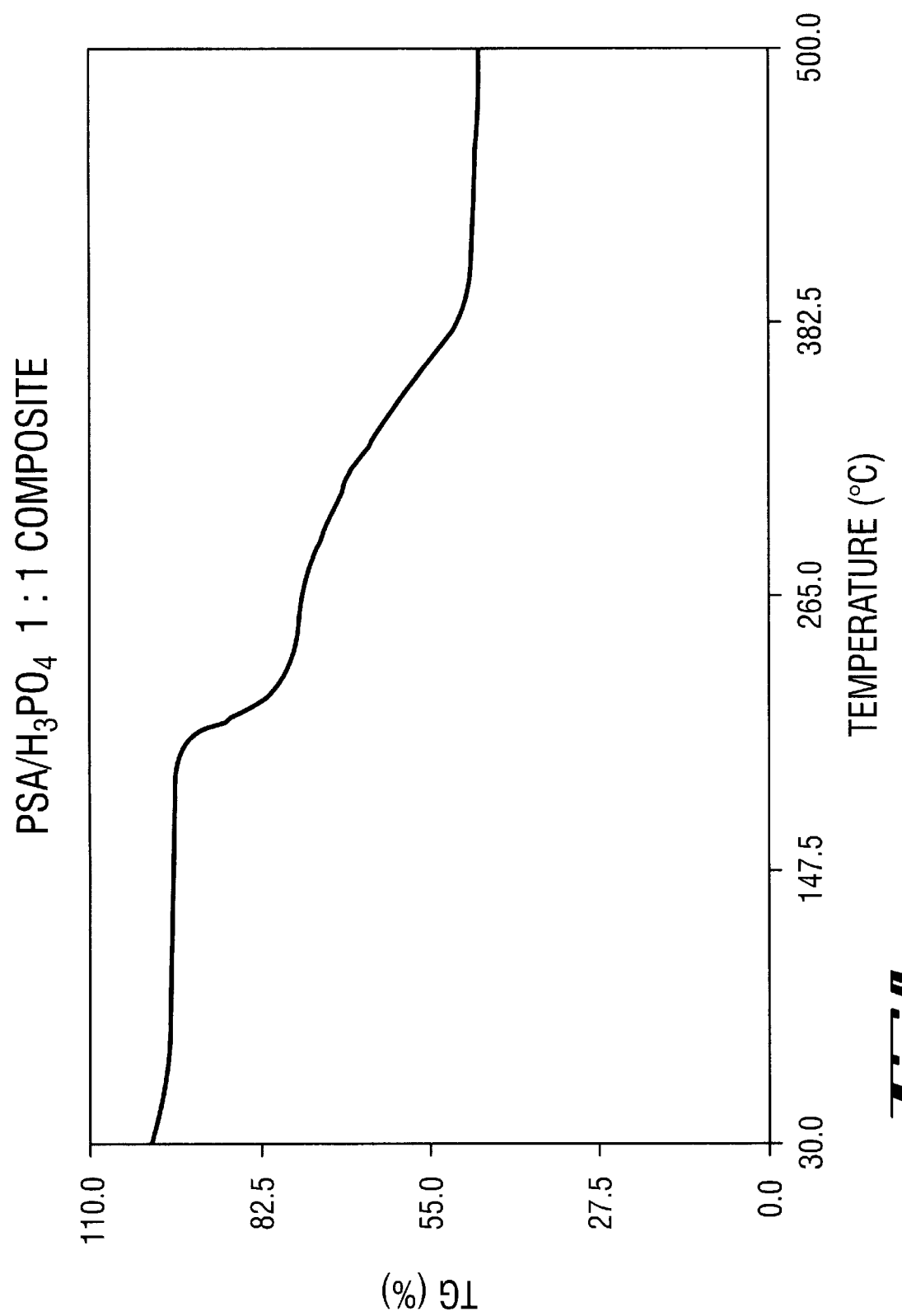
FIG. 9 is a TG-DTA spectrum of a polysilamine/phosphoric acid (1:1) composite.
Figure 10:
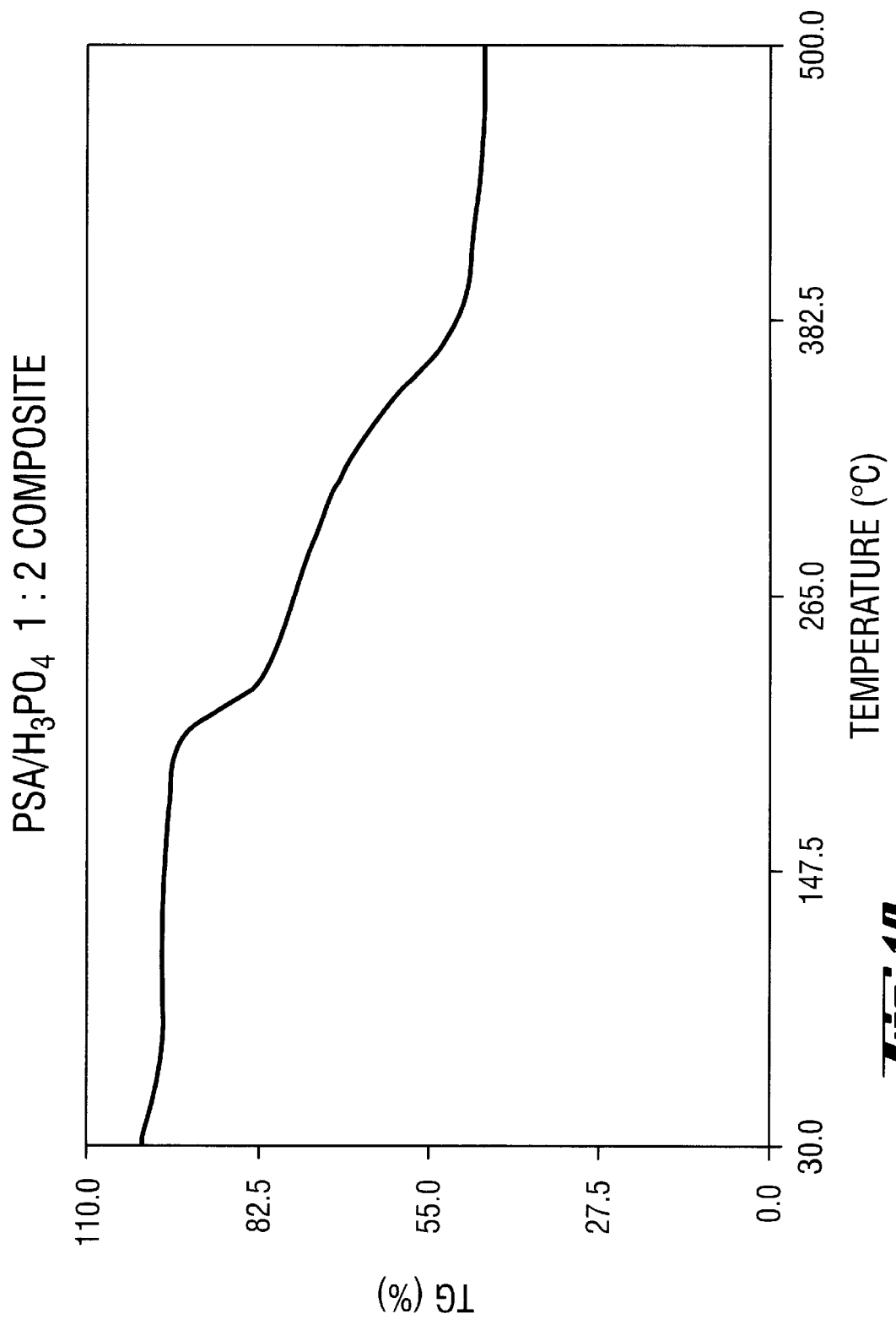
FIG. 10 is a TG-DTA spectrum of a polysilamine/phosphoric acid (1:2) composite.

Dry samples of three types of composites were placed on an aluminum pan and the heat resistance was evaluated by carrying out the TG-DTA measurement (Seiko Instruments Inc., TG-DTA 200). In the thermal analysis, the temperature was raised from 25° C. to 500° C. at a rate of 5° C./min in a nitrogen atmosphere. The results of these thermal analyses are shown in FIGS. 8 to 10.

With all the three types of composites, the weight was not reduced up to around 200° C. Thus, it has been found that the composites has heat resistance of about 200° C. independent of the phosphoric acid content.

It is thought that the weight loss at 200° C. is due to the elimination of water by the condensation of phosphoric acid, and water is released by the two steps as shown by the following equations.

$$2H_3PO_4 \rightarrow H_4P_2O_7 + H_2O$$

$$H_4P_2O_7 \rightarrow 2HPO_3 + H_2O$$

On the other hand, in the TG-DTA of the polysilamine alone the weight was reduced by 5% at 400° C.

(5) Measurement of Water Content

It is known that the humidity and the vapor pressure show a certain relationship at a constant temperature in a closed space above a saturated aqueous solution where a solid phase is present therein. Accordingly, in consideration of this relationship, saturated aqueous solutions of calcium chloride hexahydrate, sodium sulfate monohydrate, sodium nitrate, zinc sulfate heptahydrate were prepared at 20° C., respectively, and desiccators for a relative humidity of 30, 50, 70 and 90% were prepared, respectively. In each desiccator 0.05 g of a sample was placed on a TEFLON® sheet and left to stand for five days. The weight of the sample after five days was measured, and the water content was obtained from the weight increase. The water content was obtained by the following equation.

$$\text{Water Content (\%)} = \left\{ \left( \begin{array}{c} \text{Water} - \\ \text{Containing} \\ \text{Weight} \end{array} \right) \left( \begin{array}{c} \text{Dry} \\ \text{Weight} \end{array} \right) \Big/ \left( \begin{array}{c} \text{Dry} \\ \text{Weight} \end{array} \right) \right\} \times 100$$

The results are shown in Table 2.

TABLE 2

| Relative Humidity | Sample | Water Content (weight %) |
|---|---|---|
| 30% | (1:1) Composite | $5.521 \times 10^{-2}$ |
|  | (1:2) Composite | $6.809 \times 10^{-2}$ |
| 50% | (1:1) Composite | $9.557 \times 10^{-2}$ |
|  | (1:2) Composite | $1.869 \times 10^{-2}$ |
| 90% | (1:1) Composite | $8.317 \times 10^{-2}$ |
|  | (1:2) Composite | $5.918 \times 10^{-2}$ |

The water contents of the composites were obtained, and it has been found that all the samples contain hardly any water. However, there might be a possibility that exact values have not been obtained since the amounts of the samples used in the measurement of water content were as small as about 0.05 g.

(6) Measurement of Ion Conductivity by DC Regulated Voltage

Figure 11:
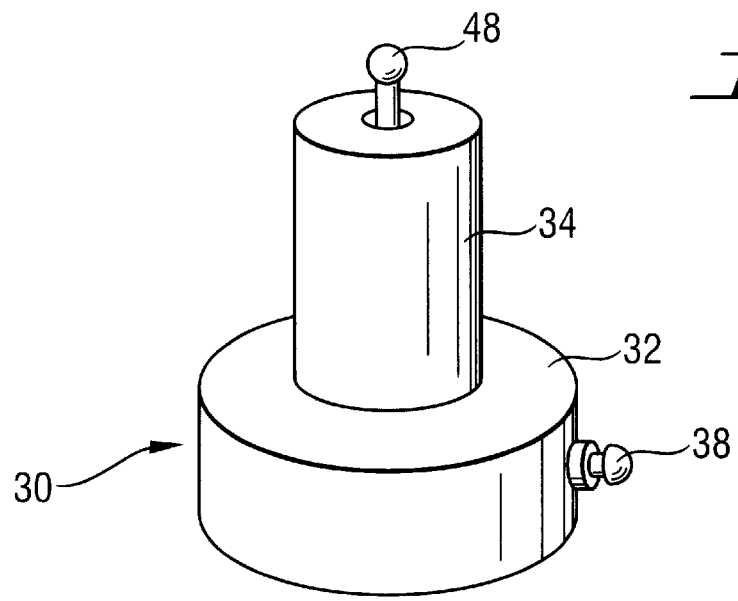
FIG. 11 is a general view of an ion conductivity measuring apparatus.
Figure 12:
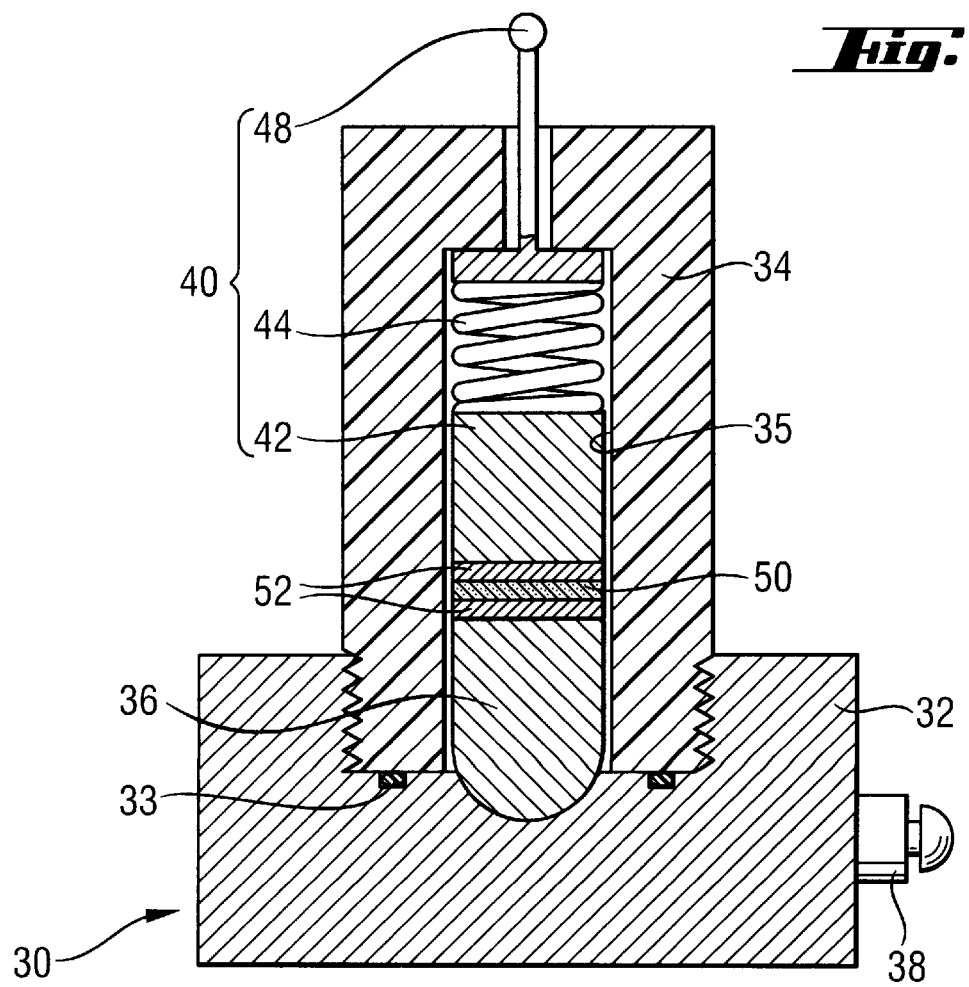
FIG. 12 is a cross section of an ion conductivity measuring apparatus.

The ion conductivity was measured with the use of an apparatus 30 as shown in FIG. 11 and FIG. 12.

The apparatus 30 has a base 32 and a holder 34 releasably fixed to the base 32.

The base 32 is provided with a terminal 38 and the base is made of a conductive material such as a metal.

The holder 34 has, for example, a cylindrical shape and is provided with a cylindrical hole 35 The holder 34 is made of an insulating material such as a plastic and a polytetrafluoroethylene is preferably used. At the end of the holder 34, an O-ring 33 is provided.

In the hole 35 of the holder 34, a block member 36 fixed to the base 32, a sample 50 and a pair of electrodes 52 holding the sample therebetween, and a member 40 which presses the sample 50 in the direction of the base 32 can be set up. The member 40 has a block member 42, an elastic member 44 such as a spring fixed to the block member and a terminal 48 fixed to the elastic member. By the elastic member 44, the electrodes 52 can closely be tightened on the block member 36 and the block member 42 to enable a more accurate measurement.

The composite was crushed in a mortar and compressed to form a pellet. This pellet was used as the sample 50. This sample 50 was inserted between a pair of platinum electrodes 52 having a diameter of 13 mm. Then, the sample 50 and the platinum electrodes 52 were placed on the block member 36 and subsequently, the member 40 was placed on the sample and the platinum electrodes 52 and further, the holder 34 was fixed on the base 32.

Then, between the terminal 38 and the terminal 48, a DC regulated voltage of 1.0 V was applied and the change in current was measured.

Figure 13:
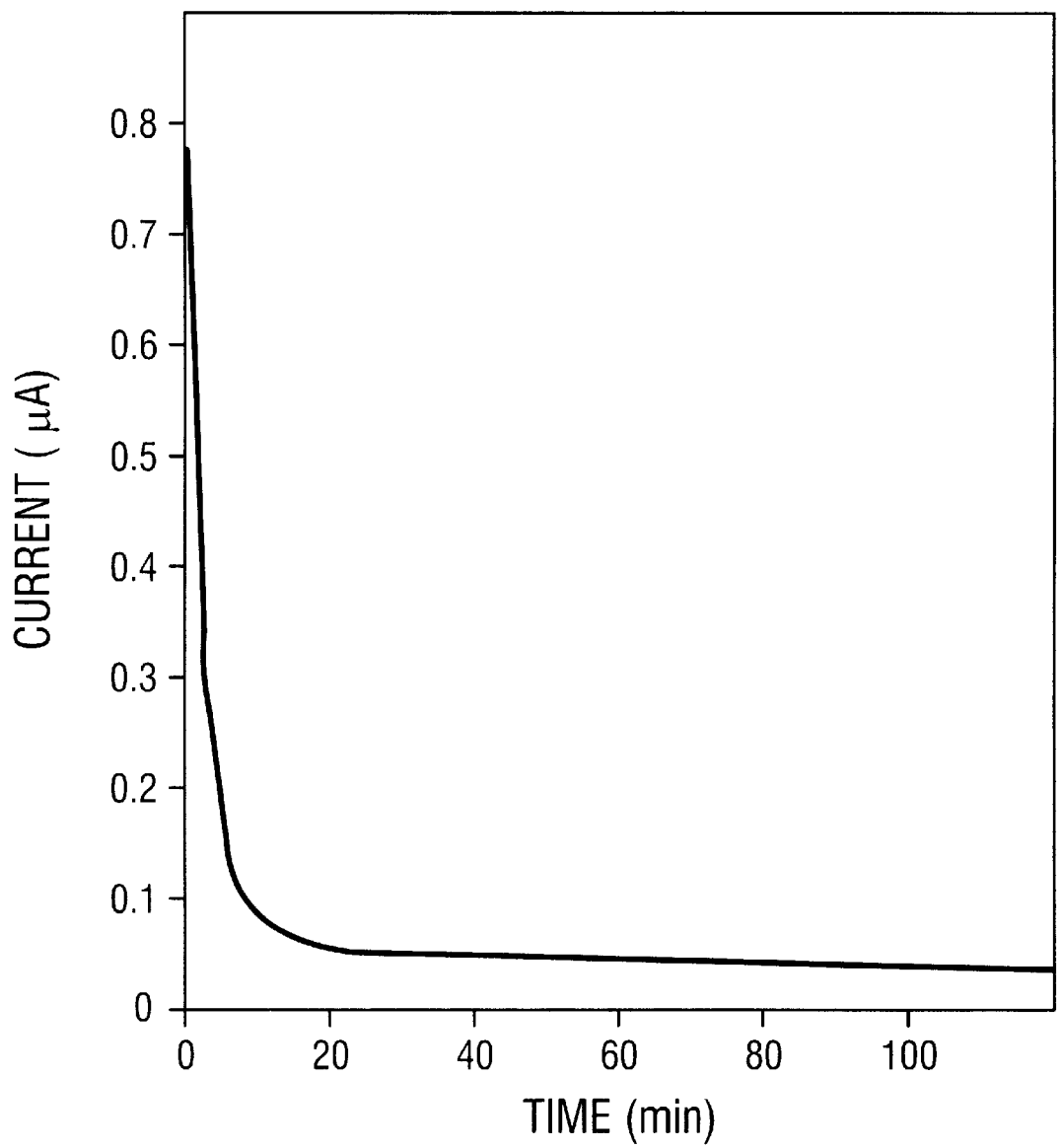
FIG. 13 is a graph showing the results of measuring ion conductivity.

The results are shown in FIG. 13. A polarization accompanied by the unevenness of ions between the platinum electrodes 52 was observed. Accordingly, it has been confirmed that the composite has ion conductivity.

(7) Measurement of Conductivity

Since it has been confirmed that the sample has ion conductivity from the result of (6), the sample was measured by the complex independence method by AC.

The pellet in (6) was placed in a cell of the apparatus 30 as shown in FIG. 11 and FIG. 12 and then, the conductivity of the sample was measured with the use of a YHP 4192 ALF impedance analyzer. More specifically, the absolute value and the phase angle of the impedance of the cell were measured by the following conditions.

| Measurement Conditions | Range of Wavenumber | 5 Hz to 13 Hz |
|---|---|---|
|  | Applied Potential | 12 mV |
|  | Range of Temperature | 20 to 160° C. |

From the data thus obtained, a complex impedance measurement was carried out by using a personal computer (NEC PC-9801), and the results were subjected to graphic (Cole-Cole plot) processing. By extrapolating these data, the resistance value Rb of the sample was obtained, and the conductivity was calculated. The Cole-Cole plot is shown in FIG. 14.

Figure 14:
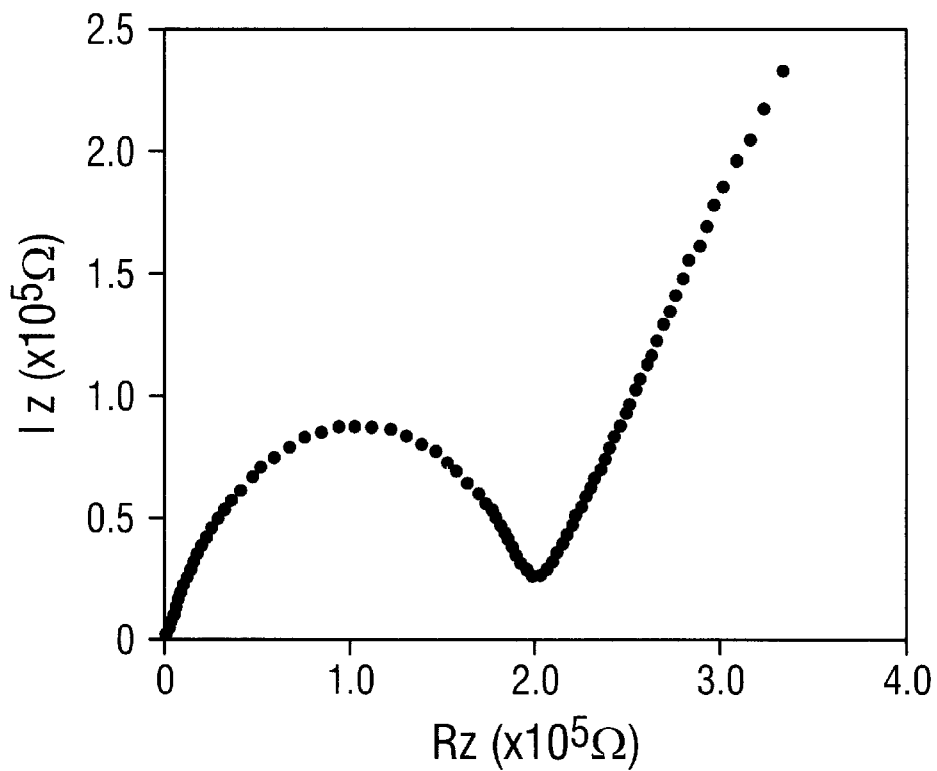
FIG. 14 is a Cole-Cole plot which is the results of mea-suring complex impedance.
Figure 15:
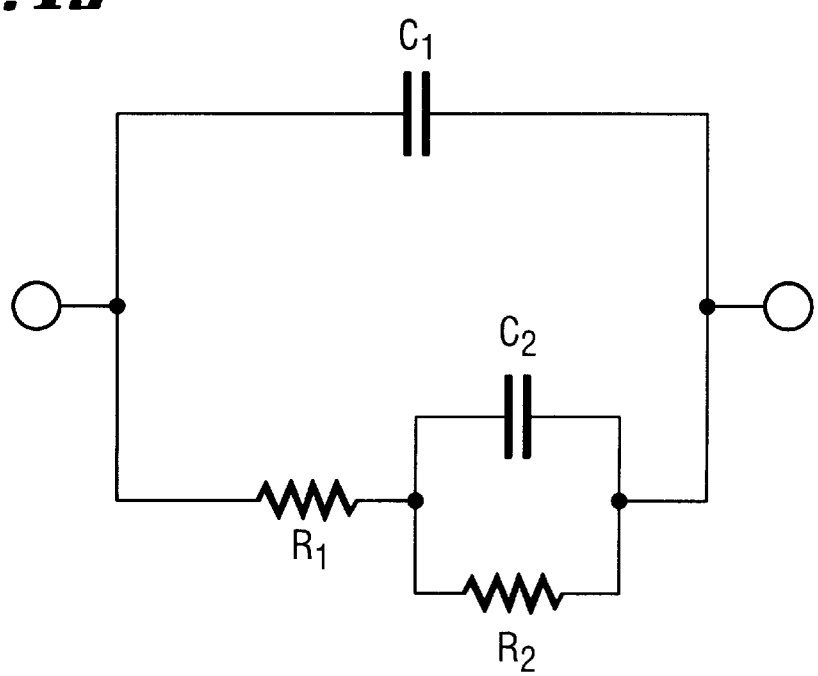
FIG. 15 is an equivalent circuit of the structure of a sample and a pair of electrodes.

From this Cole-Cole plot of FIG. 14, the structure of the sample 50 and the pair of electrodes 52 are shown by an equivalent circuit. This equivalent circuit is shown in FIG. 15. In the Cole-Cole plot, an impedance between the electrolyte and the electrodes appeared in the low frequency region, and the resistance value Rb of the electrolyte was obtained and the conductivity of the composite was calculated from the equation as follows:

$$\sigma = d/(Rb \cdot S)$$

wherein

σ a is a conductivity;

d (cm) is a thickness of a membrane;

Rb (Ω) is a resistance value of the electrolyte; and

S (cm$^2$) is an area of the electrode.

Figure 16:
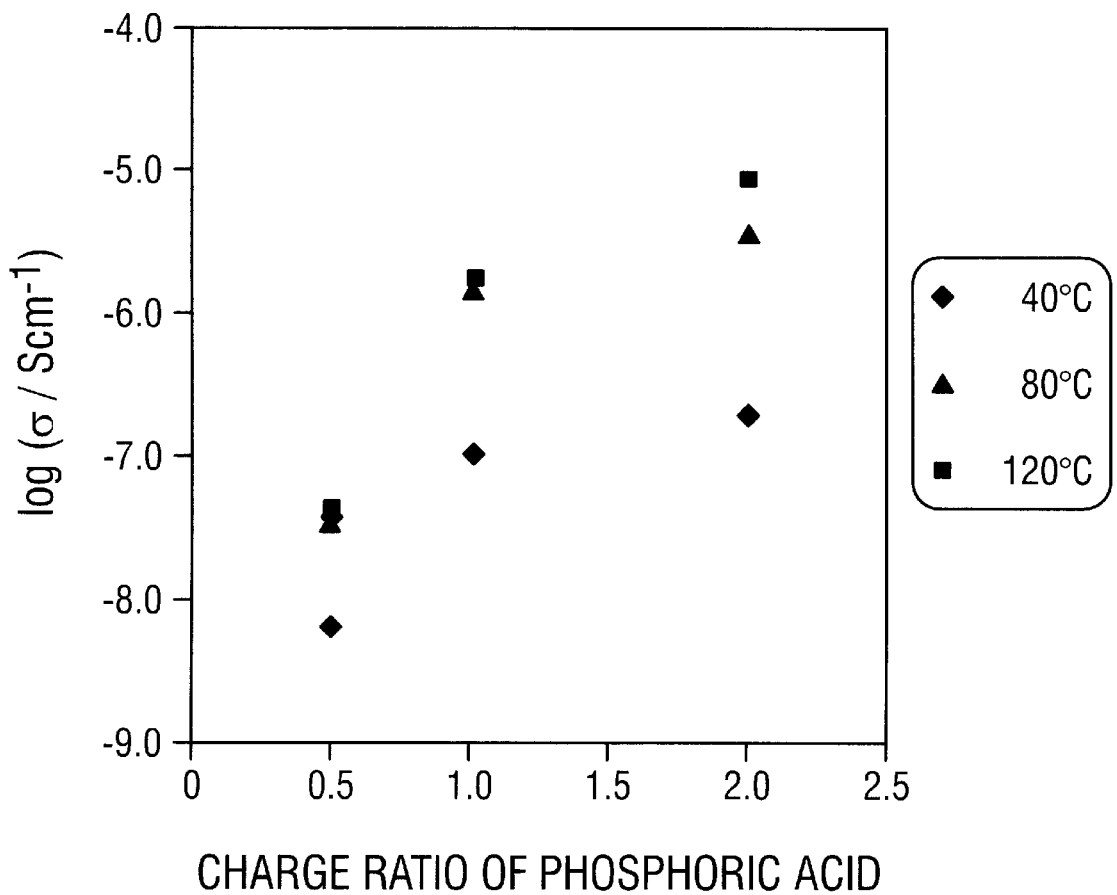
FIG. 16 is a graph showing the relationship between the charge ratio of phosphoric acid in a composite and the conductivity of the composite.

FIG. 16 shows the relationship between the charge ratio of phosphoric acid and the conductivity of the composite. The results show that increased charge ratios or contents of phosphoric acid increase the conductivity.

Figure 17:
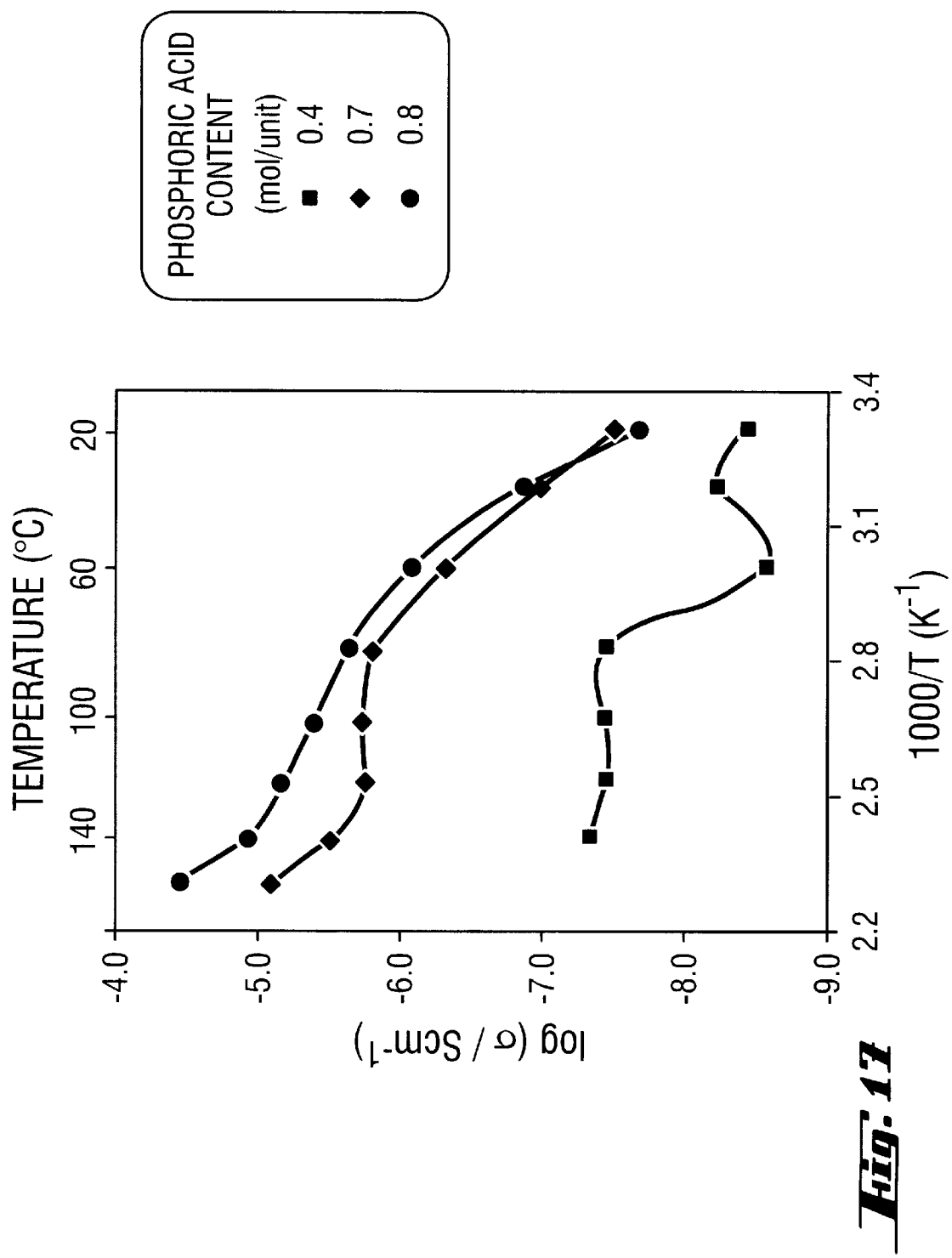
FIG. 17 is a graph showing the relationship between the conductivity of a composite and the temperature.

FIG. 17 shows the temperature dependence of the conductivity of the composite is shown. Typically, increased temperatures increase the conductivity.

EXAMPLE 2

In Example 2, a polysilamine membrane was prepared.

(1) Preparation of Reagents

The polysilamine obtained in Reference Example was used as it is. This polysilamine was yellow and transparent had a little viscosity, and the molecular weight was 200.

As Epotort, the one provided by Prof Nagasaki of Science University of Tokyo that was a colorless, transparent, viscous substance was used as it is. The structural formula of Epotort is shown below.

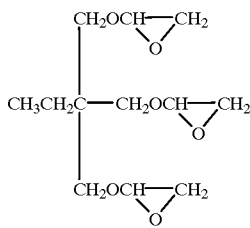

With tetrahydrofuran (THF), a guaranteed reagent commercially available from Wako Pure Chemical Co., Ltd. was purified by atmospheric distillation and a fraction of 65° C. was used.

(2) Preparation of Polysilamine Membrane

Both terminal amino groups of the polysilamine were crosslinked with three epoxy groups of Epotort.

3.03 g (4.09 mmol, amine equivalent of 8.20 mmol) of polysilamine were dissolved in 10 ml of THF, and 1.19 g (epoxy weight equivalent 8.26 mmol) of Epotort were dissolved in 10 ml of THF. Therefore, a THF solution of polysilamine and a THF solution of the Epotort having the same equivalent were prepared. 2 ml of the THF solution of polysilamine were mixed with 4 ml of the THF solution of Epotort and stirred to obtain a solution of polysilamine/Epotort (1/2). This solution was poured into a 3×4 cm tray TEFLON® sheet and left to stand for one day in a thermostatic chamber maintained at 100° C. to gel. Then, a membrane was formed by the casting method and dried under reduced pressure for two days to obtain a polysilamine membrane.

(3) Thermal Analysis (Evaluation of Heat Resistance)

The polysilamine membrane was placed on an aluminum pan and the heat resistance was evaluated by the TG-DTA (Seiko Instruments Inc., TG-DTA 2000).

Figure 18:
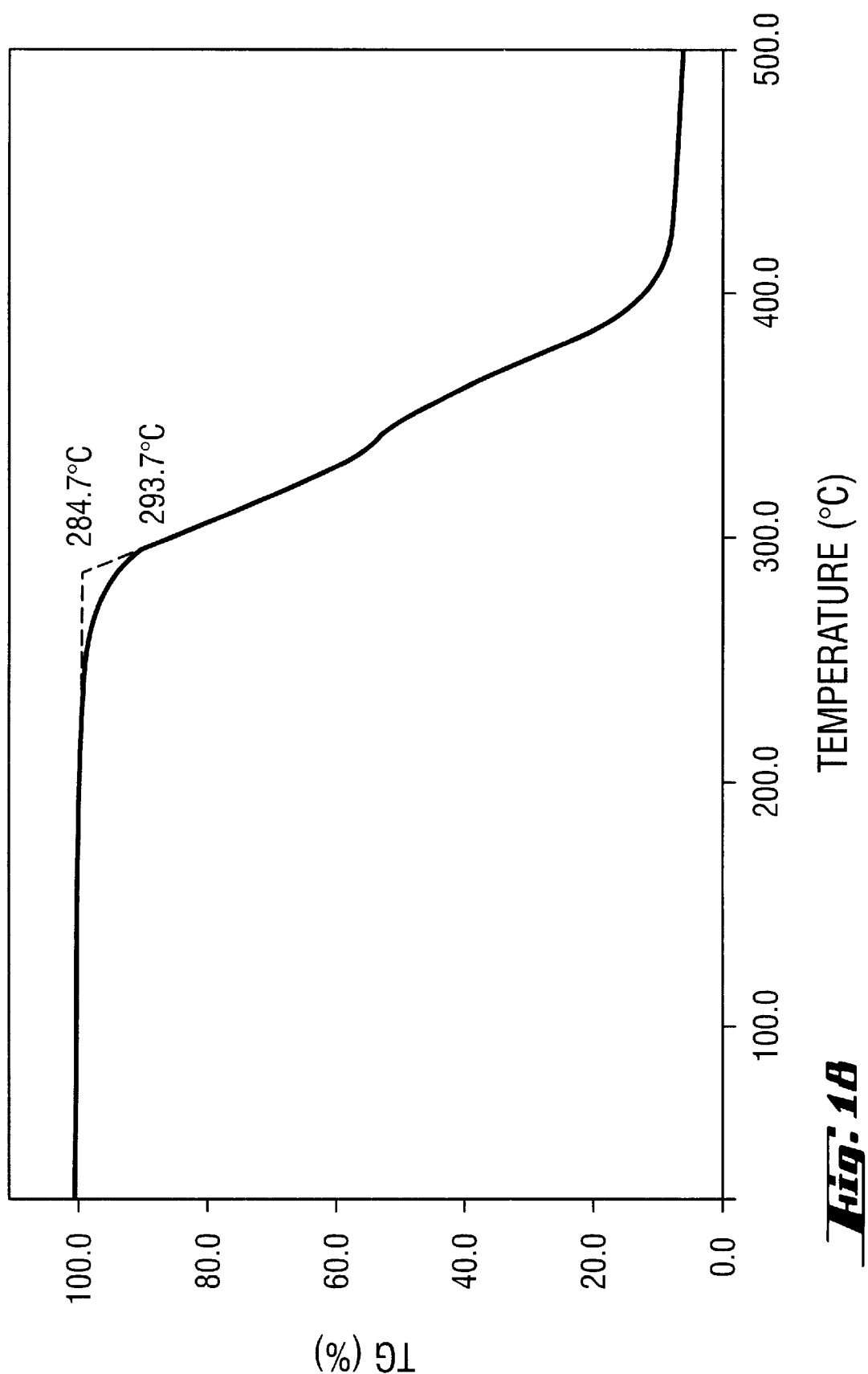
FIG. 18 is a TG-DTA spectrum of a polysilamine membrane.

In the thermal analysis, the temperature was raised from 25° C. to 500° C. at a rate of 5° C./min in a nitrogen atmosphere. The results are shown in FIG. 18.

The weight loss was observed at 284.7° C. and the reduced substance has not yet been identified.

According to the composite of the present invention, while the proton conductivity of a strong acid is maintained, it is easy to handle the composite as is the case of a solid electrolyte membrane.

What is claimed is:

1. A composite comprising:

a polysilamine having a repeating unit represented by the following formula

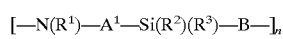

[—N(R$^1$)—A$^1$—Si(R$^2$)(R$^3$)—B—]$_n$ wherein

R$^1$, R$^2$ and R$^3$ are the same or different and each is a hydrogen atom or a lower alkyl group;

A$^1$ is a lower alkylene group which may be substituted by a lower alkyl group, a group represented by the formula —A$^2$—N(R$^4$)—A$^3$— or a group represented by the formula —A$^2$—N(R$^4$)—A$^3$—N(R$^5$)—A$^4$, wherein A$^2$, A$^3$ and A$^4$ are the same or different and each is a lower alkylene group which may be substituted by a lower alkyl group;

R$^4$ and R$^5$ are the same or different and each is a hydrogen atom or a lower alkyl group;

B is a lower alkylene group which may be substituted by a lower alkyl group; and n is an integer of not less than 2, and a strong acid.

2. The composite of claim 1 wherein said polysilamine is crosslinked by a crosslinking agent.

3. The composite of claim 1 comprising 0.05 to 2 mol of a strong acid per mol of amino group.

4. The composite of claim 1, having a proton conductivity, at 100° C., of not less that 10$^{-6}$ S/cm.

5. An electrolyte membrane formed of the composite of claim 1 in the shape of a membrane.

6. A fuel cell having a plurality of unit cells, each unit cell having an electrolyte membrane of claim 5 and a pair of electrodes holding said electrolyte membrane therebetween.

* * * * *